Fig. 1.

D. W. SHIEK.
COMPUTING MACHINE.
APPLICATION FILED JAN. 31, 1907.

1,151,055.

Patented Aug. 24, 1915.
10 SHEETS—SHEET 4.

Fig. 4.

Witnesses—
Geo. H. Morse.
Charles J. Cobb

Inventor
Daniel W. Shiek
By Hill & Hill
Attys

D. W. SHIEK.
COMPUTING MACHINE.
APPLICATION FILED JAN. 31, 1907.

1,151,055.   Patented Aug. 24, 1915.
10 SHEETS—SHEET 5.

Fig. 5.

Witnesses—
Geo. H. Morse.
Charles J. Cobb

Inventor—
Daniel W. Shiek
By Hill & Hill
Attys.

UNITED STATES PATENT OFFICE.

DANIEL W. SHIEK, OF INDIANAPOLIS, INDIANA, ASSIGNOR TO WALTER L. MILLIKEN, OF BARNSTABLE, MASSACHUSETTS.

COMPUTING-MACHINE.

1,151,055.  Specification of Letters Patent.  Patented Aug. 24, 1915.

Application filed January 31, 1907. Serial No. 355,134.

*To all whom it may concern:*

Be it known that I, DANIEL W. SHIEK, a citizen of the United States of America, residing at Indianapolis, county of Marion, and State of Indiana, have invented certain new and useful Improvements in Computing-Machines, of which the following is a description.

My invention belongs to that general class of devices designed to be manipulated to perform certain computations, and has for its object the production of a machine that shall be accurate and exact in its operation, readily and easily controlled in performing its functions and that may be employed for the general purpose of listing as well as computing.

To this end it consists of the novel construction, arrangement and combination of parts herein shown and described, and more particularly pointed out in the claims.

In the drawings wherein like or corresponding reference characters indicate like or corresponding parts.

Figure 1:
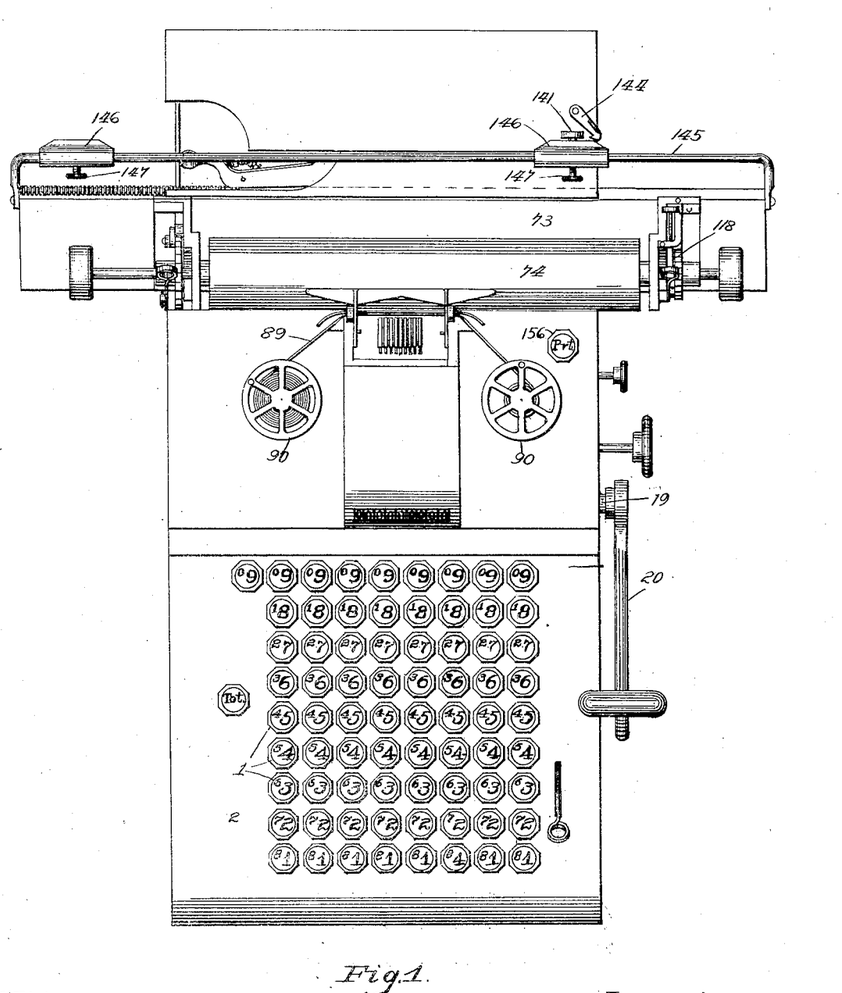
Figure 1 is a plan view of a computing machine embodying my invention.

In the form shown in the drawings, 1—1, etc., are vertically movable keys arranged in banks as shown, preferably corresponding to the numerals 1 to 9 inclusive, each numeral row consisting of a sufficient number of keys to register the highest numerical quantity likely to be required. As shown in the drawings the key board comprises nine banks or longitudinal rows representing the ordinals 1 to 9 inclusive, eight of the banks consisting of eight rows of keys each, and the ninth of nine rows (see Fig. 1). For brevity and convenience of description, I shall hereinafter refer to a single series of keys extending longitudinally of the machine, containing the numerals 1 to 9 inclusive, as a section of keys, while a transverse series of keys each with the same numeral thereon as a row of keys.

2 is the cover plate of the key board, and 3 is the base. The keys are positioned in suitable apertures formed in the plates 2 and 3, and are normally held in retracted position by suitable springs 4 or equivalent means. Each section is provided with a longitudinally movable bar 5 arranged to retain the keys of the section in a depressed position. A longitudinally movable bar 6 is positioned beneath and in line with each section of keys, and provided with a stop 7 for each key in the section. Commencing with the key bearing the numeral 9 the several stops are so positioned upon the bar 6 that the distance from the face of each stop to the face of the lower point of the corresponding key regularly increases to the key bearing the numeral 1 thus graduating the movement of the bar 9 by the operation of the keys 1, its maximum longitudinal movement being obtained in the form shown when none of the keys are operated and its minimum when the ninth key is depressed.

In the form shown the bars 6 are moved longitudinally by means of a shaft 8 upon which is loosely or rotatably mounted for each bar a segment gear 9 and a double segment gear 10. An arm 11 is also pinned or fixedly secured to the shaft 8 for each bar 6 and carries near its free end a freely rotatable pinion 12 the several parts being so arranged and proportioned that each pinion 12 is simultaneously engaged with both the segment gears 9 and 10. Each of the segment gears 9 is connected by means of a rod 14 to its particular bar 6 all of the parts so far referred to being preferably constructed and arranged substantially as shown and fully described in my Patent Number 757,511, for a mechanical movement dated April 19th, 1904.

Any suitable means may be employed to normally control the position of the parts above described. As shown a stop 15 is positioned in the path of the double segment gear 10, and a spring 16 extends from near the extremity of an arm 17 upon the gear 10 to a suitable point upon the frame 18 to resiliently hold the gear against the stop. When so arranged a partial rotation of the shaft 8 will, by the movement of the pinion 12, tend to move both the gears 9 and 10 along with the pinion but owing to the action of the spring 16 the double segment gear 10 will remain in contact with its stop, and only the gear 9 and its connected parts, the bar 6 and rod 14, will be moved unless some obstruction sufficient to overcome the tension of the spring 16 is encountered, such for example as one of the stops 7 engaging one of the keys. When this occurs the movement of the segment gear 9 is stopped and the double segment gear 10 moves from the stop 15 and is carried forward during the remainder of the movement of the shaft 8.

Any suitable means may be employed to rotate the shaft 8 a fixed part of a turn at each operation of the machine. As shown a shaft 19 extends transversely of the machine substantially parallel with the shaft 8 and is provided with a handle or arm 20 by which it may be oscillated. A cam 21 is also fixed upon the shaft 19 and an arm 22 is fixed upon the shaft 8 with a portion near its free end positioned in the path of the cam 21 an anti-friction roller 23 being preferably provided to engage the cam face. The form of the cam 21 is such that any accidental variations in the movements of the shaft 19 will not alter the movement of the shaft 8 and its associated parts.

The above described parts constitute what may be properly termed the primary operating mechanism of my device, and this portion controls the operation of the calculating and printing mechanisms although it may be operated without operating either and is, in fact in the form shown, normally entirely disconnected from the calculating mechanism.

The computing mechanism consists preferably of a plurality of suitably formed indicators, one for each series of keys, each indicator having any desired characters as for example the ordinals from 0 to 9 inclusive upon its face and mechanism for each indicator adapted to be periodically engaged with its particular portion of the operating mechanism to accurately control the position of the indicators by the movements of the operating mechanism. In the form shown each of the indicators 24 is loosely mounted upon a shaft 25 by means of an arm 26 having a pinion 27 rigidly attached thereto and preferably forming an extension of the bearing of the arm upon the shaft. A segment gear 28 is provided for each indicator having a finger 29 suitably formed to bear upon the face of a spiral cam 30 loosely mounted upon a shaft 31 extending transversely of the machine the weight of the indicator and connected parts being usually sufficient to maintain the finger in contact with the cam. A pinion 32 preferably having ten teeth is rigidly attached to the cam 30 and for all except the mechanism for operating the indicator for the first section of keys at the right of the machine a ratchet wheel 33 also preferably having ten teeth is rigidly attached to the cam and pinion. The position of the shaft 31 is such that normally the pinions 32 are just out of mesh with the double segment gears 10. An arm 34 for each indicator is pivotally mounted upon the shaft 25 and provided near its free end with a roller 35 arranged preferably to engage between the teeth of the pinions 32 to partially control the movements and guard against accidental displacement. A spring 36 or other suitable means is provided to secure the desired pressure of the roller upon the pinion 32 to insure the desired operation. The several parts are so proportioned that when the roller 35 has brought the parts to rest by simultaneously engaging two teeth of the pinion 32 one of the characters upon the indicator 24 will be positioned at an opening 37 in the plate 1.

As each pinion 32 and attached parts are rotated the indicator 24 for that pinion is oscillated back and forth being alternately lifted to display the various characters and then permitted to return to its normal position in which the 0 is displayed. Gravity is usually sufficient to return the indicators to their normal positions but if preferred suitable means may be employed to aid in this result. In the form shown each full rotation of a pinion 32 and its cam 30 displays all the ordinals upon the indicator controlled by it, such movement being made by regularly spaced steps or distances until the ordinal 9 is exposed when the indicator is released and permitted to return to 0.

Any suitable means may be employed to temporarily engage the pinions 32 with the external series of teeth upon the double segment gears 10. In the form shown a shaft 43 is rotatably mounted transversely of the machine with an arm 44 rigidly secured thereto near each end, and the shaft 8 is mounted in suitable bearings positioned near the free ends of the arms 44. A lever 45 is also rigidly attached to the shaft 43 and provided near its free end with a notch 46 adapted to be engaged by a rotatable spring actuated dog 47 upon the cam 21 thereby partially rotating the shaft 43, elevating the shaft 8 and forcing the double segment gear 10 into engagement with the pinion 32 before the rotation of the shaft 8 has commenced. A spring actuated latch 48 is provided to engage the free end of the arm 45 when depressed by the dog 47 and retain the parts in that position until the shaft 19 nears the limit of its operative movement when a pin 49 or other suitable means preferably upon the cam 21 engages a lever 50 mounted upon a suitable part of the frame 18 with its free end in position to engage a suitable part of the latch 48, as for example the pin 51. The operation of the lever 50 forces the latch 48 out of engagement with the lever 45 permitting the parts to immediately resume their normal positions.

As above described the movements of each of the indicators 24 are controlled by its particular segment gear, cam, and pinion engaging one member of the operating mechanism and entirely independent from the remaining indicators with their similar connected mechanisms, but it is evident that in machines of this class mechanism should be provided to so connect the computing mechanism that when one indicator passes from 9 to 0 the next indicator to the left will be advanced one step or space, so that the total reading of the indicators will be increased one unit of the order which the indicator returning to 0 indicated. Any suitable means may be provided for this purpose. As shown two shafts 52 and 53 are rotatably mounted transversely of the machine. A cam 54 is rigidly mounted upon the shaft 52 and an arm 55 is rigidly mounted upon the shaft 53 with an anti-friction roller 56 mounted near the free end of the arm and in position to engage the cam and thus control the movements of the shaft 53 by the movements of the shaft 52. A plurality of arms 57 one for each ratchet 33 are loosely mounted upon the shaft 53, each provided with a spring actuated dog 58 adapted to engage the teeth of its particular ratchet and advance the same one space for each oscillation of the arm. A pivotally mounted trip 59 or equivalent means is provided to engage each of the arms 57 and normally prevent their operative movement, and a pin 60 or other suitable means is provided upon each cam 30, or other convenient part rotating synchronously therewith, arranged to engage a suitable portion of the trip 59 controlling the operation of the arm 57 for operating the ratchet attached to the next cam to the left, so that when the pin 60 upon any particular cam engages its trip 59 the arm 57 will be released and rotate the next cam to the left one step.

Any preferred means may be employed for oscillating the arms 57. As shown a bar 61, is rigidly connected to the shaft 53 by the parts 62, and an extension 63 is provided upon each of the arms 57 extending into the path of the bar 61. A spring 64 connects the free end of each of the arms 57 to a suitable portion of the frame 18 and tends to hold the extension 63 against the bar 61 and thereby resiliently force the roller 56 against the face of the cam 54. The cam 54 is preferably so formed that as the shaft 52 is rotated the movement of the shaft 53 and bar 61 will first move the arms 57, against the tension of the springs 64, into position to be engaged by the trips 59, after which the shaft 53 is permitted to rotate in the opposite direction sufficiently to allow a slight operative movement and prevent any arm 57 released from its trip 59 from becoming reëngaged until the arm is allowed to make its full operative stroke and advance its particular ratchet one tooth, this action may occur when the depression 65 upon the cam arrives at the roller 56 after which the arms are again all forced into engagement with the trip 59.

Any suitable means may be employed to drive the shaft 52. As shown a crank 66 is mounted upon the shaft 19 and a crank preferably of lesser radius is provided upon the shaft 52 the two being connected by a bar 67 so that each movement of the shaft 19 will produce a corresponding movement of the shaft 52. The movements of the shaft 19 are also controlled by the relative radii of these connected cranks.

To insure smooth operation and the continuous rotation of the shaft 52 in the same direction suitable means may be provided to pass the crank upon the shaft 52 by its "dead center." In the form shown the crank upon the shaft 52 consists in merely a gear wheel 68 provided with a laterally projecting pin 69 to which one end of the bar 67 is attached. A pinion 70 preferably of one half the diameter of the gear 68 is mounted upon a suitable portion of the frame 18, and provided with a laterally projecting pin or equivalent means 71 to which is attached one end of a spring 72 the opposite end being attached to a suitable part of the frame 18. The pinion 70 and gear 68 are meshed with each other in such relation and the several parts are so arranged that the crank formed by the pin 71 upon the pinion 70 will pass its dead center slightly before the crank upon the shaft 52 so that each time the crank upon the shaft 52 arrives at its dead center the spring 72 and its associated parts will operate as a motor to drive the mechanism until the dead center is past.

The printing or listing mechanism is provided to print upon a suitable movable strip or sheet of paper or the like, the numbers indicated by the manipulation of the keys, and comprises preferably, means for holding the paper to receive the impression, a plurality of suitable type, means for selectively arranging the type in printing position relative to the paper, and means for moving the type toward the paper to produce the desired impression.

In the form shown the paper holding mechanism comprises a longitudinally movable carriage 73 arranged transversely of the machine and provided with a platen roller 74 of the usual or any preferred form. The usual or any satisfactory means may be provided for holding the paper in contact with the roller so that by slightly rotating the roller the paper will be moved from the line for one row of figures to the next as required, but as these specific details form no part of the present invention a more extended description is not required.

The type and type holders or carriers may be of any desired form or construction. As shown a type carrier is provided for each section of keys, and upon each type carrier are mounted ten movable type comprising the ordinals from 0 to 9 inclusive preferably arranged in regular order. Each type carrier consists of an arm 75 pivotally attached at one end to a shaft 76 and having at its free end an arcuate portion 77 concentric to the shaft 76. A plurality of levers 78, one for each type carrier, are provided each pivotally mounted near its center upon a shaft 79. The upper end of each lever 78 is connected by a bar 80 to one of the arms 75, and at its lower end is connected by a rod 81, to one of the bars 6; so that the position and movements of each type carrier are controlled by the operation of the corresponding section of keys.

The type may be arranged upon the type carriers in any desired manner. As shown a portion near the extremity of each of the parts 77 is slightly increased in thickness and provided, for each type, with a transverse radial slot 82 and a radial opening 83 extending from a point near the center of the back of each slot to the periphery of the part 77. A concentric opening 84 is also provided near the periphery of the part 77 at the back of the several slots 82 so that at this point the part 77 merely consists of what may be called an open curved frame 85 with the slots 82 in one wall and the openings 83 extending through the opposite walls at the back of each slot. The type are each provided with a rectangular head 86 of suitable size to snugly fit a slot 82 and with a stem 87 positioned in the opening 83 and projecting at the periphery of the frame 85. A suitable spring 88 for each stem 87 is positioned in the opening 84 arranged to normally hold the heads 86 firmly seated upon the bottoms of their respective slots. This mechanism, that is, the type carriers, ink ribbon 89, and its spool 90 and mechanism for feeding the ink ribbon and for moving the type carriers into approximately the proper printing positions, I prefer to designate as parts of the operating mechanism of my device, and to class as the printing mechanism the parts which operate only when an impression is to be made. This comprises the parts employed to finally adjust the several type carriers to accurately aline the type in "printing position" that is, those type which are substantially in position and are about to be employed to produce the impression, the mechanism for directly operating the type to produce the impression, and the parts which prevent the operation of those type not required.

Figure 3:
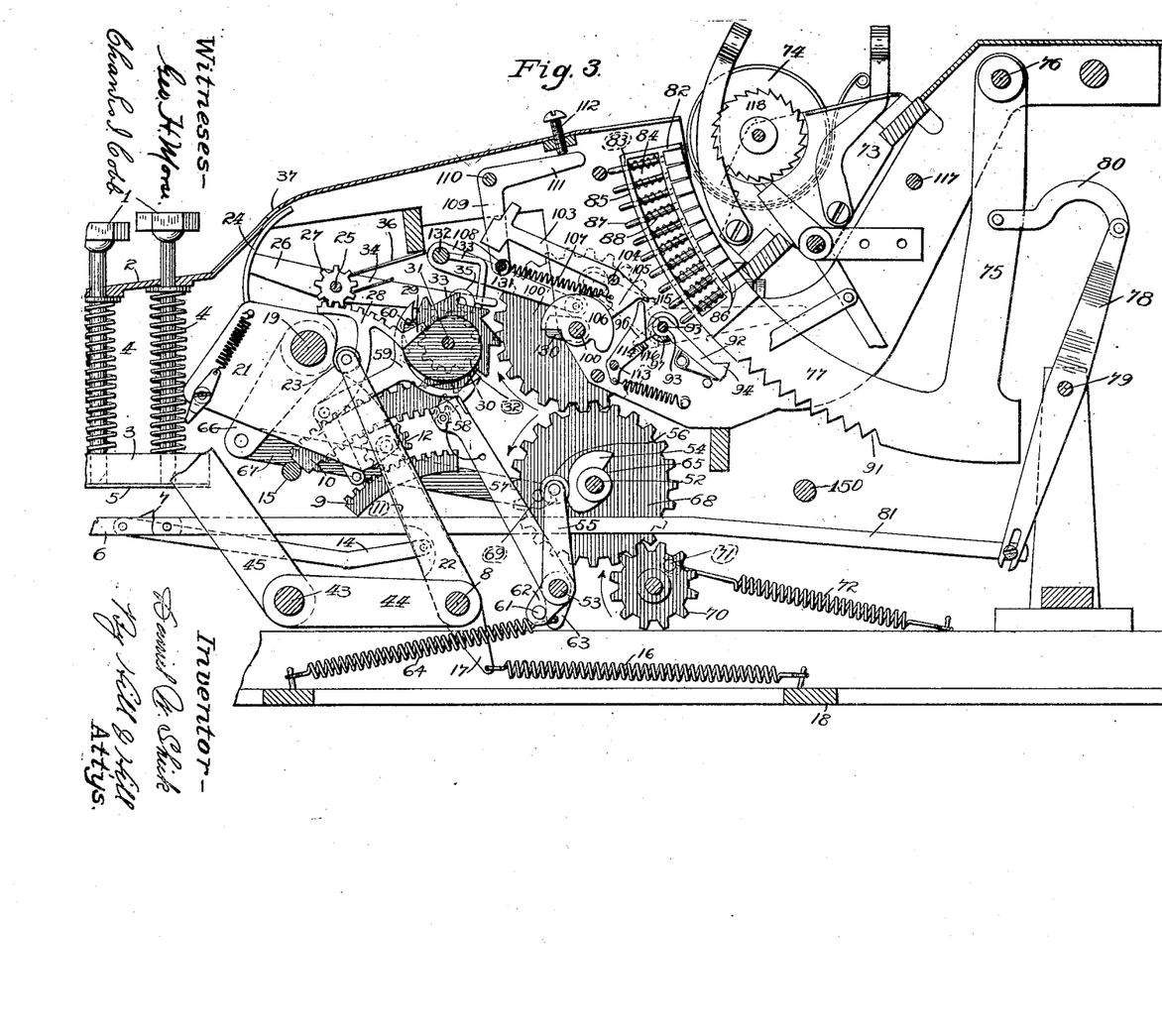
Fig. 3 is a longitudinal vertical section through the machine with parts removed and others broken away to more clearly show the construction and arrangement.
Figure 4:
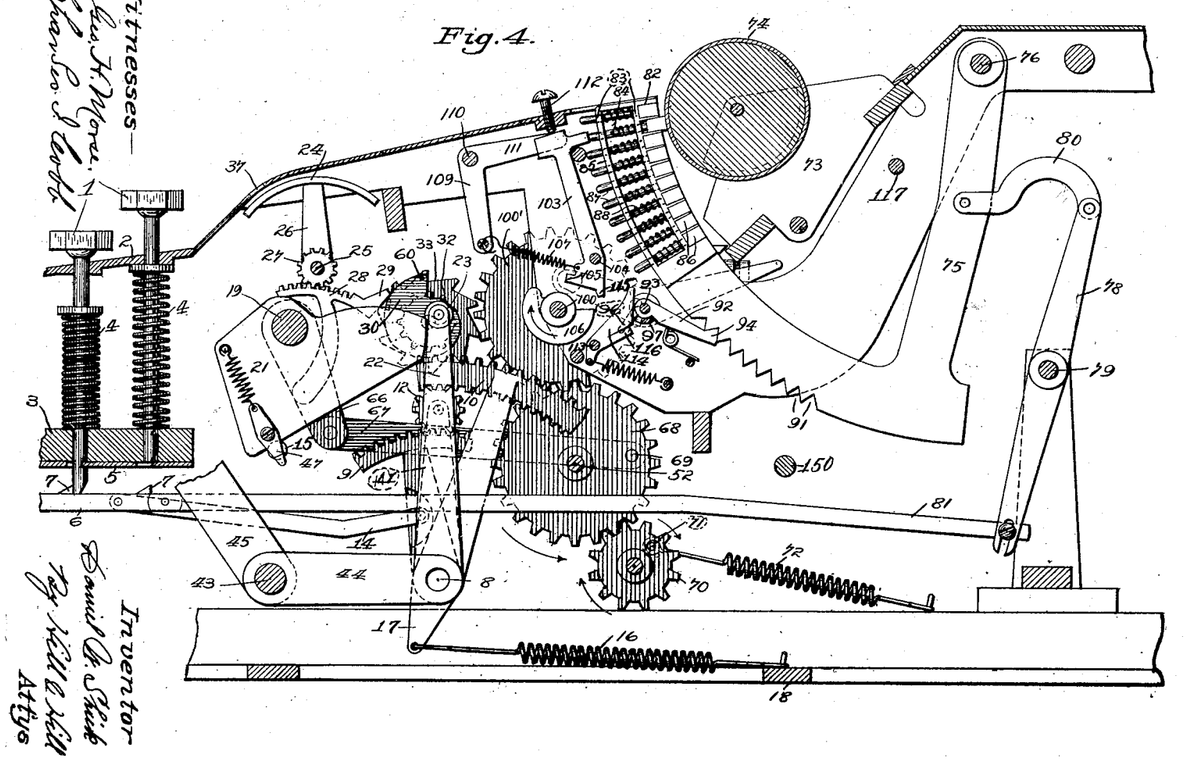
Fig. 4 is a similar section also with certain parts broken away and others removed to show the parts illustrated in Fig. 3 in a different position during the operation.
Figures 7, 8, 9, 10, 11, 12, 13:
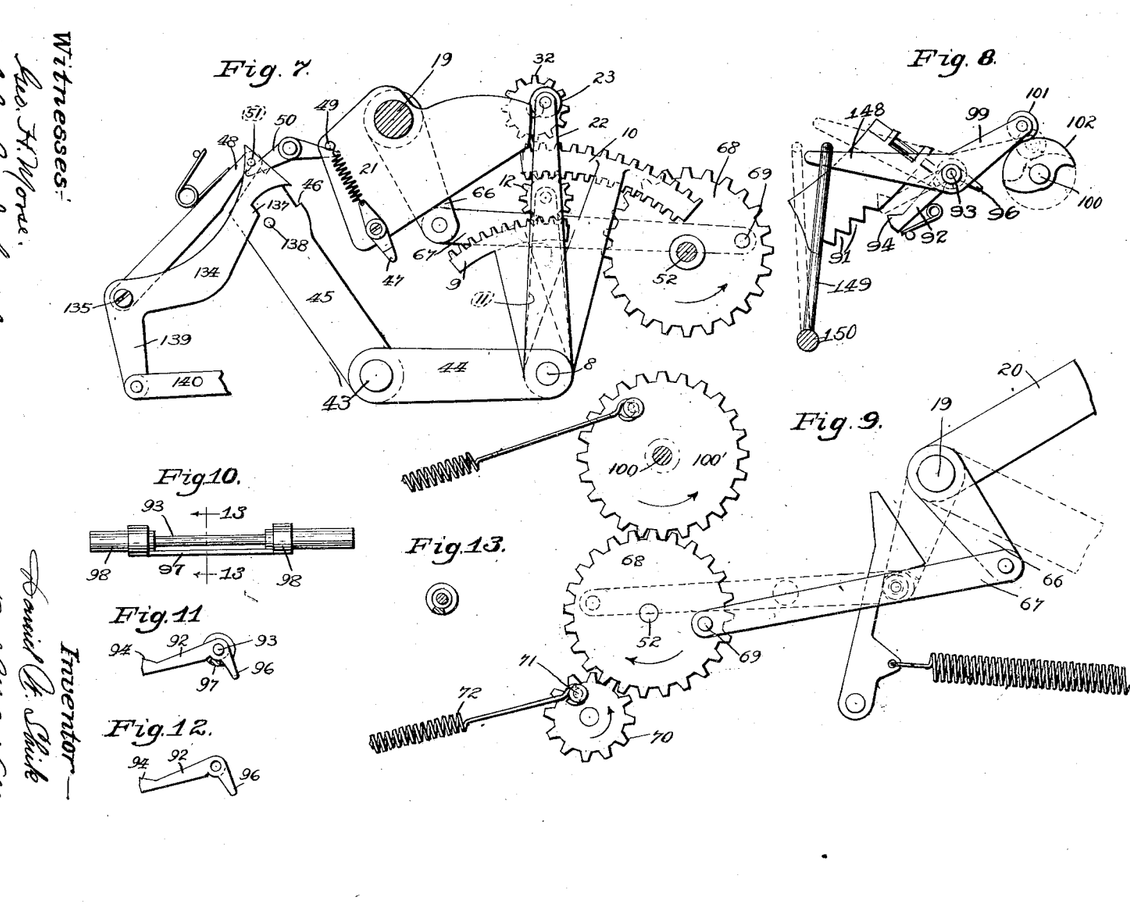
Fig. 7 is an enlarged detail of the parts for moving the computing mechanism into operative engagement with the operating mechanism.
Figs. 8, 10, 11, 12 and 13 are enlarged details of the parts for controlling the operation of the printing mechanism during the operation of the device.
Fig. 9 is an enlarged detail of the parts employed for passing the crank of the main driven shaft past its centers and insuring its constant movement and smooth operation in one direction when the device is operated.
Figure 14:
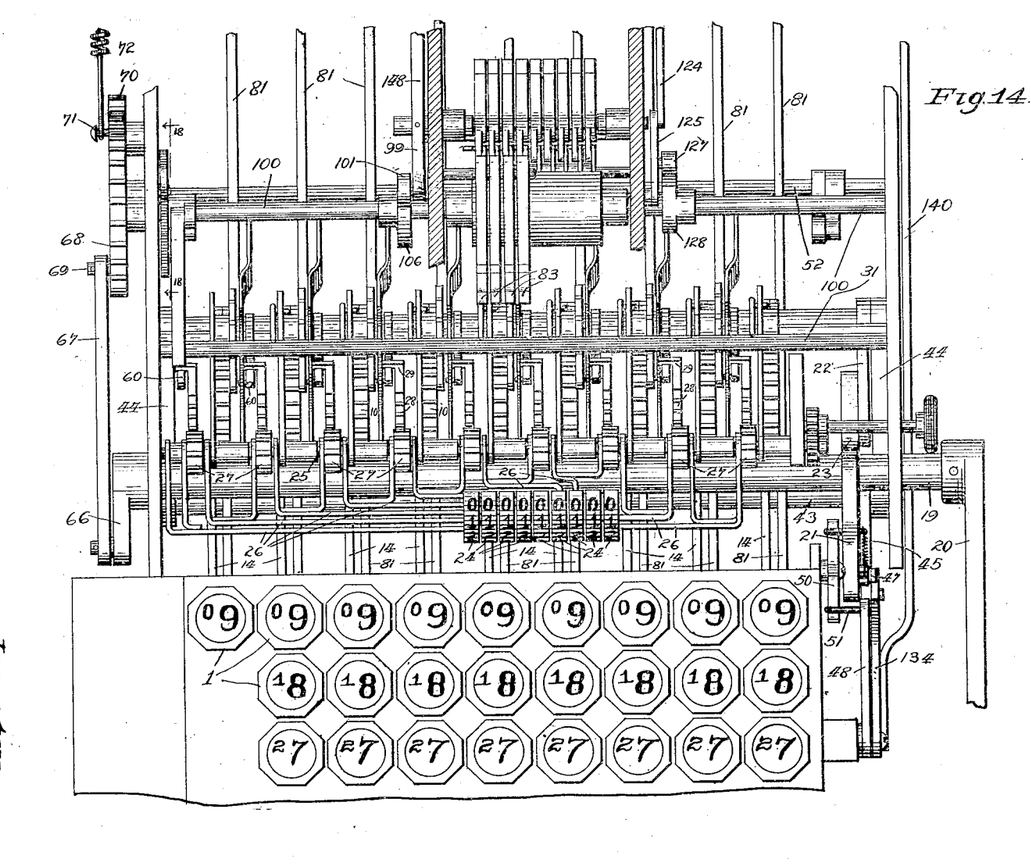
Fig. 14 is an enlarged partial plan view of my device with portions removed or broken away to more clearly show the construction.

Any suitable means may be provided to accurately aline the type upon the several type carriers. As shown a plurality of engaging points are provided upon each type carrier, arranged to correspond with the position of the type and a detent is provided for each type carrier arranged to temporarily coöperate with any of the engaging points to control the position of the several carriers. In the form shown in Figs. 3, 4 and 8 these engaging points consist of V-shaped notches 91 formed in the part 77 and the detents are arms 92 pivotally mounted at one end upon the shaft 93 and provided with a part 94 formed to fit the notches. A spring 95 is provided tending to force the part 94 toward the notches. Any suitable means may be employed to prevent engagement of the part 94 with the part 77 when the type carrier is in motion or when it is not desired to print. As shown an extension 96 is provided upon each of the arms 92 projecting at an angle thereto. A bar 97 is loosely positioned in the space between the several arms 92 and their extensions 96 and rigidly attached to the shaft 93 by collars 98, 98 engaging the shaft formed at each end of the bar. An arm 99 is also rigidly attached to the shaft 93 and provided at its free end with a roller 101 arranged to engage the face of a cam 102 mounted upon a rotatable shaft 100 provided with a gear wheel 100′ adapted to mesh with the gear 68 to rotate the same. The form of the cam 102 is such that before any movement of the type carrier occurs the shaft 93 is rotated until the bar 97 engages the several extensions 96 and withdraws the parts 94 from the parts 77 and as soon as the type carriers arrive at their printing position a depression in the cam liberates all the arms 92 and permits the part 94 of each arm to engage a notch 91.

Figures 2, 19:
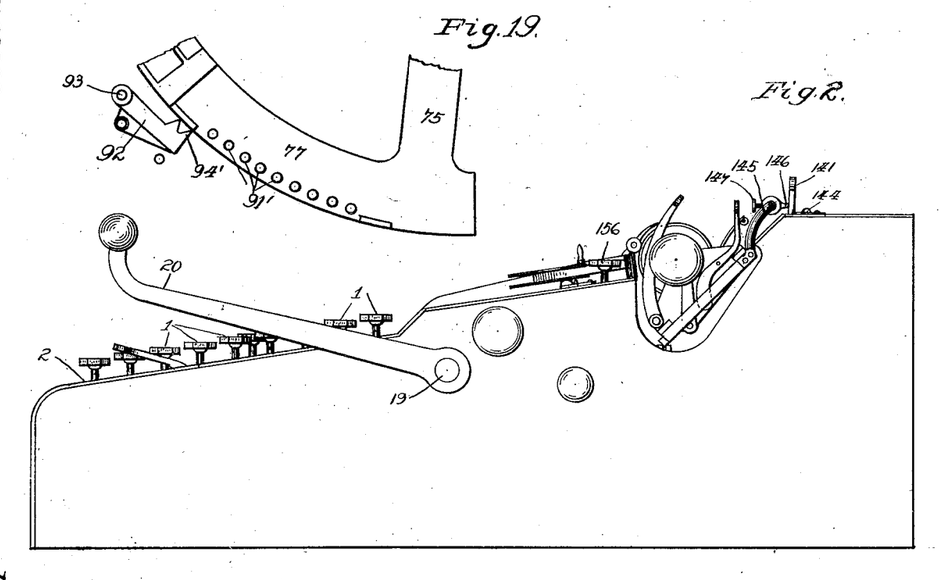
Fig. 2 is a side elevation of the same.
Fig. 19 is a detail of a slightly modified form of type alining mechanism.

The form shown in Fig. 19 is substantially the same in general construction except that in place of the notches 91 a series of pins 91′ are provided and in place of the part 94 upon each arm 92 the part 94′ is formed with a substantially V-shaped recess in its face adapted to engage and accurately locate any one of the pins. The general operation is substantially the same in both forms.

Any suitable means may be employed to operatively move the various type when in printing position. As shown a plurality of hammers 103 are provided, one for each type carrier, each pivotally mounted upon a shaft 104 and provided with a projection 105 adapted to coöperate with a cam 106 upon the shaft 100. A spring 107 is provided to operatively move each hammer and resiliently force the same against the projecting stem 87 of a type to move the same toward the platen 74 and produce an impression. In the form shown the several springs 107 are each attached at one end to a hammer and at the opposite end to a bar 108 rigidly connected by the arms 109, 109 at its ends to a shaft 110. One of the arms 109 is preferably provided with a bell crank extension 111 or equivalent means whereby the operative tension of all the hammer springs 107 may be simultaneously adjusted by slightly rotating the shaft 110 by the operation of a screw 112 engaging the free end of the extension 111 or other suitable means for the purpose. The cam 106 is formed to engage the projection 105 and retract each of the hammers, and hold the same in a retracted position while the type carriers are being moved, and after they are finally adjusted in printing position the hammers are released by the cam for a sufficient period to permit their operation after which they are again engaged by the cams and retracted.

As so far described it is apparent that, at each operation of my device, the type carriers for any row of keys wherein no key is operated will travel to the full limit of its movement, or until the 0 type is in printing position, and if the type hammers were all permitted to operate under such conditions, a row of ciphers would be printed, or in case a single key near the center of a row were operated, ciphers would be printed both to the right and to the left of the figure corresponding to the key operated.

Under ordinary circumstances the printing of ciphers to finish the row to the right of the number is not only unobjectionable but a great advantage, enabling any number in which ciphers occur to be printed without the necessity of operating extra keys for the ciphers; but obviously it would be very undesirable to precede, or print to the left of, each number enough ciphers to complete the full row of the machine employed; and also if the machine were operated when no key was depressed to print a full row of ciphers in the column. This objectionable feature may be obviated in any desired manner. As shown a shaft 113 is provided and a plurality of spring actuated latches 114, one for each hammer, are loosely mounted upon said shaft each with a part adapted to engage a suitably formed projection 115 upon one of the hammers when the hammer is retracted and lock the same against operative movement. Each latch is provided with a laterally projecting arm 116 extending to, and adapted to engage the next latch to the left, so that when one of the latches 114 is moved out of position to engage its hammer the arm 116 of each latch to the right will be successively engaged and each of these latches will be similarly moved, while those to the left will not be disturbed.

The arms 116 are each positioned in the path of the extension 96 upon the detent 92; the several parts being so arranged that when a detent engages an engaging point upon a type carrier the latch normally engaging the hammer for operating the type upon that particular type carrier, and also the latch for all the hammers to the right of it will be moved out of engaging position leaving those hammers free to operate while any hammers to the left will be locked against operation as before. In the form shown the number of engaging points is one less than the number of type in each series, or upon each type carrier. That is, where ten type comprising the numerals 0 to 9 inclusive are employed, each numeral except the 0 is provided with an engaging point as hereinbefore described, and in place of an engaging point for the 0 means are provided upon the type carriers to prevent sufficient movement of the detents to release the latches 114 thus preventing the printing operation when no key is operated, printing all the ciphers to the right of any figure printed and preventing the printing of the ciphers to the left of a number.

As shown the accurate alinement of the 0 type when in printing position is secured by providing a permanent fixed stop 117 positioned to engage the several arms 75 and so proportioning the several parts for primarily actuating the type carriers, that when no key of a series is operated, the type carrier for that series will be advanced until its arm 75 is resiliently forced against the stop 117 with sufficient force to insure proper alinement of the type.

Figure 6:
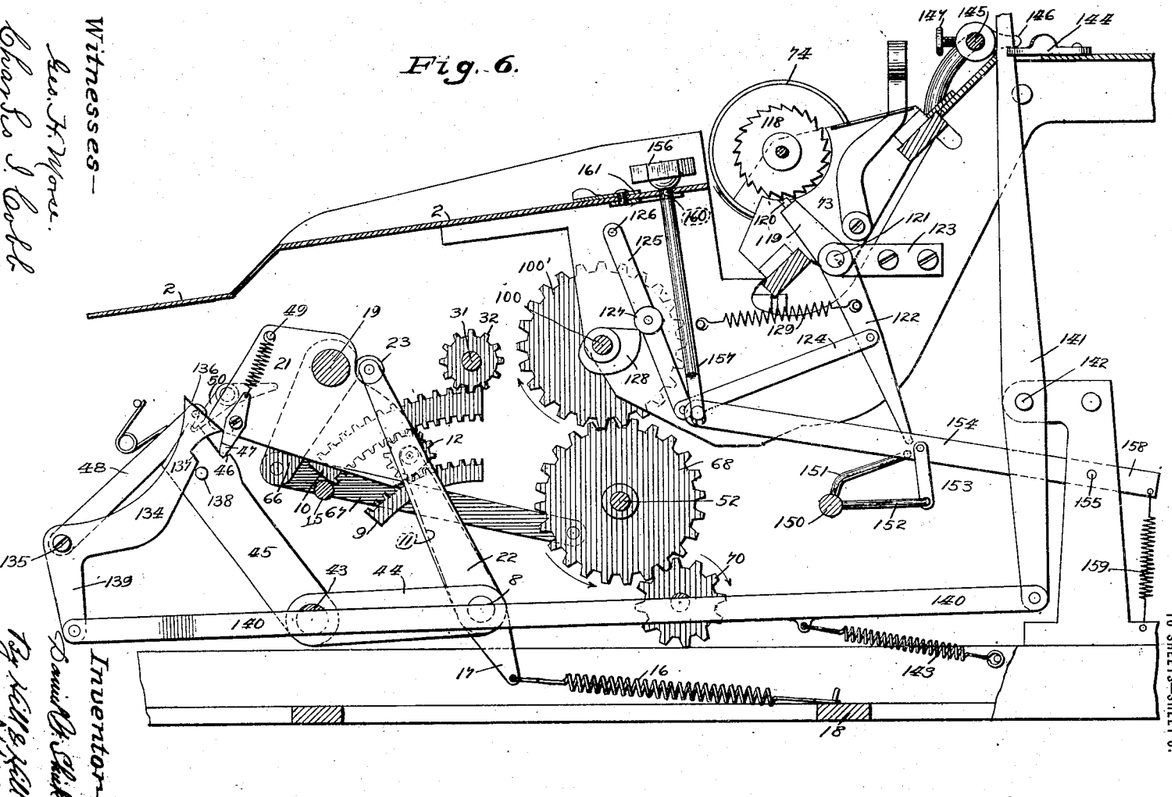
Fig. 6 is the same section showing the parts in a different position during the operation of the device.

In case it is desired to increase the efficiency of my device means may be provided to automatically operate the paper feed at each operation of my device. In the form shown (Fig. 6) means are provided to partially rotate the platen roller 74 at each operation of the device, comprising a ratchet wheel 118 rigidly connected to the platen, and an arm 119 provided with a spring pawl 120 at its extremity. The arm 119 is rigidly attached to a shaft 121 extending longitudinally of the carriage 73 and arranged to oscillate in suitable bearings at its ends. An arm 122 adapted to oscillate the shaft 121 is slidably mounted thereon and attached to the frame of the machine by means of a guide 123 arranged to prevent lateral movement. The arm 122 is connected by a rod 124 to a lever 125 pivotally attached to the frame at 126 and provided with an antifriction roller 127 or equivalent means to engage a cam 128 upon the shaft 100. The several parts are so arranged that the positive action of the cam operatively moves the arm 119 to advance the platen 74 and a spring 129 extending from the arm 122 to a suitable point upon the frame returns the arm to position for the next operative movement. In the form shown (see Fig. 3) also a cam 130 is provided upon the shaft 100 arranged to periodically lift the free end of a lever 131 attached to a shaft 132. A plurality of fingers 133 are rigidly mounted upon the shaft 132, the free end of each finger loosely engaging an extension upon an arm 34 so that at each partial rotation of the shaft the roller 35 is lifted out of contact with the pinion 32 leaving the calculating mechanism for each series of keys temporarily free to be advanced.

Figure 5:
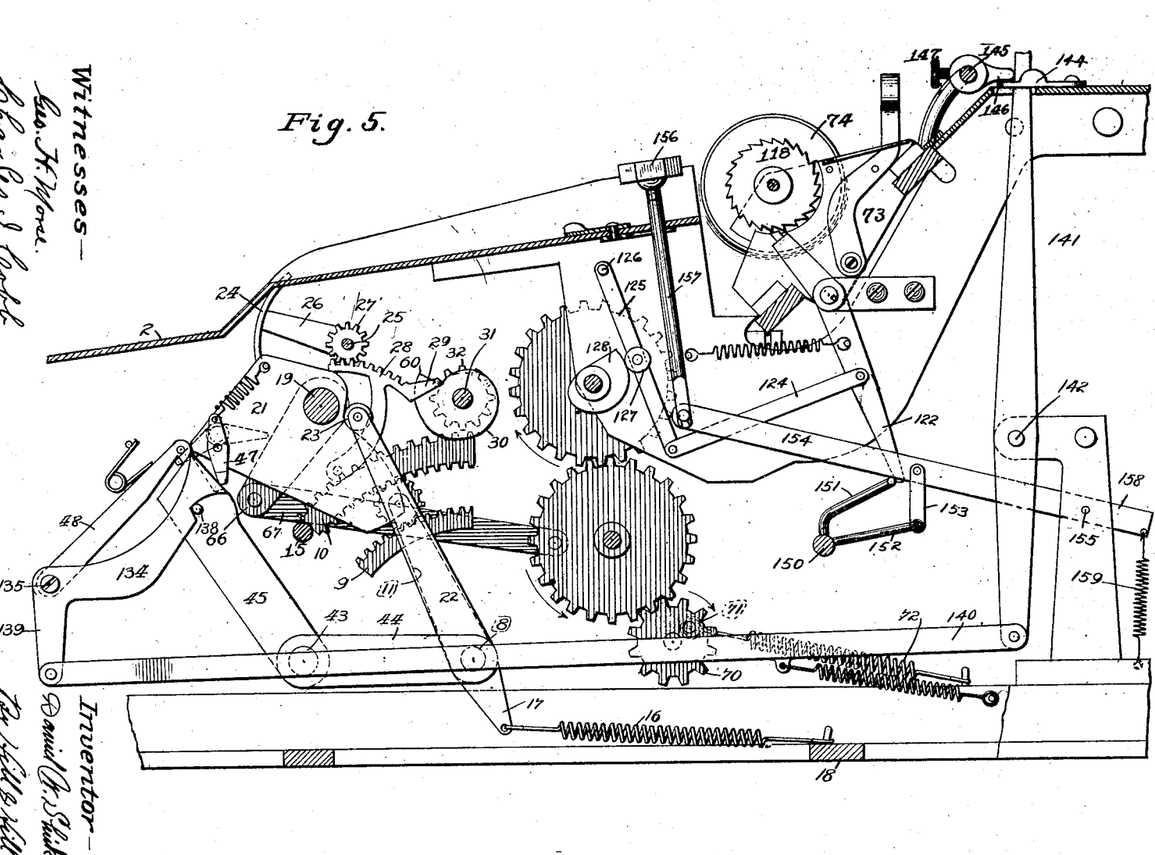
Fig. 5 is a partial transverse section with certain parts broken away and others removed to illustrate the operation of those parts controlling the listing elements of the device.

As above described the calculating and the printing mechanisms are normally out of operative engagement with the operating mechanism. If any of the keys are depressed and the shaft 19 partly rotated by the handle 20, the operating mechanism is at once moved into engagement with the calculating mechanism and enough of the printing mechanism is released to indicate the keys depressed and any ciphers to the right of them thus calculating and printing at each operation of the machine. It is often very desirable however in operating machines of this character to be able to employ the calculating portion of the mechanism without printing the separate items and also to print with the device without calculating or, especially in machines with a longitudinally movable carriage, to print several columns and only calculate the numbers in one column, for example where the several items to be calculated may be designated by lot, or car, numbers or the like. Where this arrangement is desired any suitable means may be employed to prevent the engagement of either the calculating or the printing mechanisms with the operating mechanism, without interfering with the operation of the remainder of the machine. In the form shown (see Figs. 5, 6 and 7) an arm 134 is pivotally mounted upon the frame at 135 with its free end in proximity to the free end of the lever 45. The end of the arm 134 is normally out of the path of the dog 47 but when desired the free end of the arm may be depressed so that its face 136 is substantially parallel with the side of the notch 46. When in this position the face 136 engages the dog 47 as it is moved by the cam 21 and prevents its engagement with the notch 46. To insure that no accidental movement of the lever 45 will occur while the arm 134 is so depressed a shoulder 137 is provided upon the arm 134 adapted, when the arm 134 is depressed, to engage a pin 138 or other suitable means upon the lever 45 and thus lock the same in position.

Any suitable means may be provided to control the position of the arm 134. As shown an extension 139 is provided upon the arm, connected by means of a rod or equivalent means 140 to a lever 141 pivotally mounted at 142, the free end of which extends above the top of the machine where it may be finished in any desired manner to permit convenient manipulation. If desired a spring 143 may be attached to any of the parts for operating the arm 134, as for example to the rod 140 as shown, to normally hold the free end of the arm 134 elevated, and a latch or equivalent means 144 provided to engage the lever 141 and prevent the return of the parts to their normal position.

In the preferred construction means are provided for automatically operating the lever 141 thus controlling the operation of the computing mechanism by the position of the carriage. As shown a bar 145 extends longitudinally of the carriage 73 and is rigidly attached thereto at its extremities. Any desired number or form of cam blocks 146 are mounted upon the bar 145 each preferably adapted to slide longitudinally thereon and provided with a set-screw 147 or other suitable means for rigidly securing the same in any desired position upon the bar. With a portion of each block suitably formed to engage and control the position of the lever 141 it is obvious that by adjusting the position of the blocks 146 the calculating mechanism may be operated, or prevented from operating, at any desired position of the carriage, at each operation of the machine.

Figures 15, 16, 17, 18:
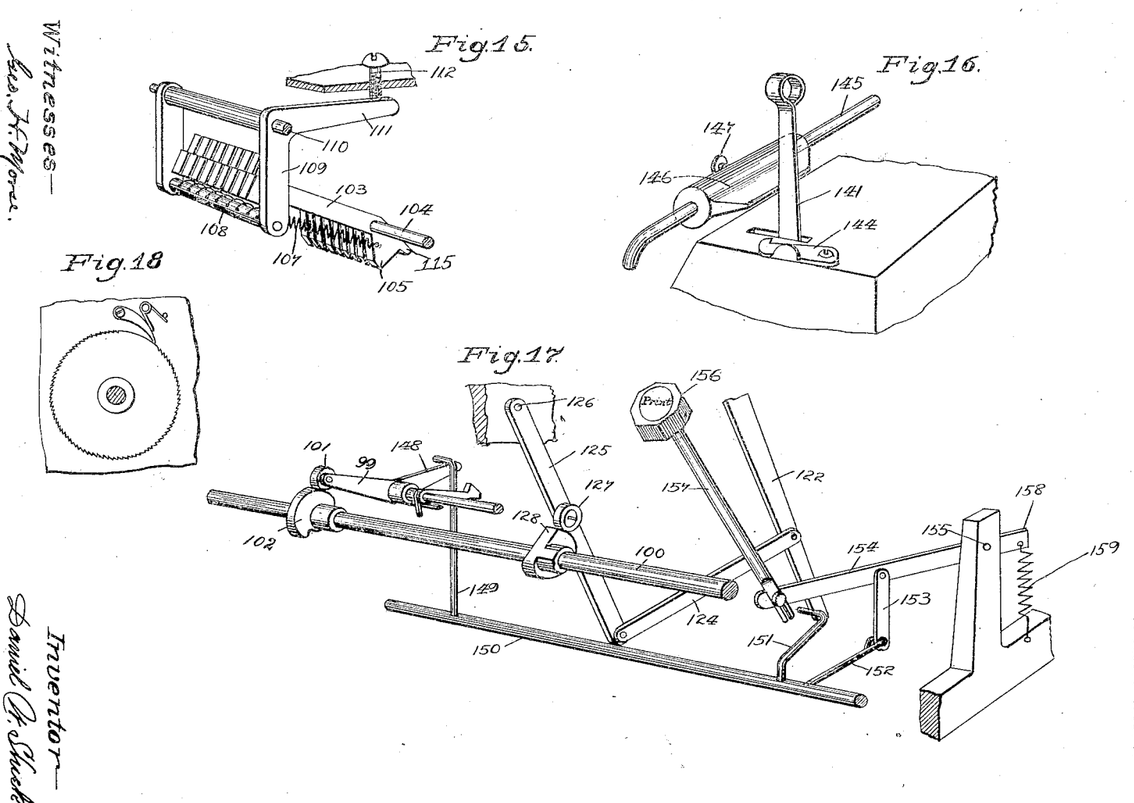
Fig. 15 is an enlarged detail of the hammer spring tensioning mechanism.
Fig. 16 is an enlarged detail.
Fig. 17 is an enlarged detail of the associated parts for simultaneously controlling the paper feed and printing mechanisms.
Fig. 18 is a partial section taken substantially on line 18—18 of Fig. 14.
Figure 20:
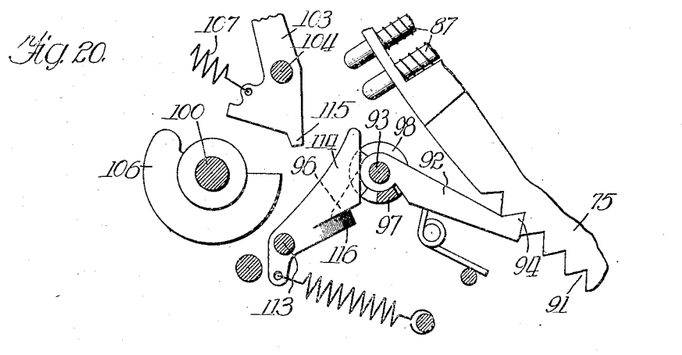
Figs. 20, 21 and 22 are detail views of certain parts enlarged for the purpose of clearness.
Figure 21:
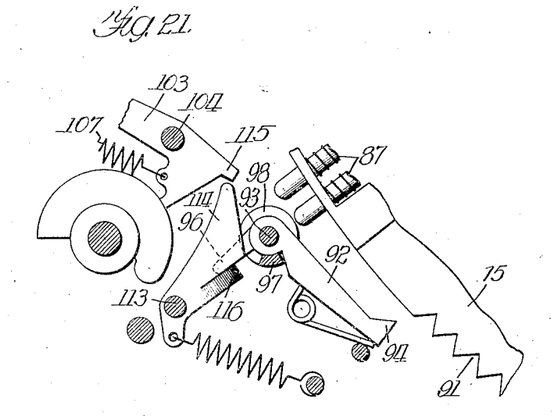
Figure 22:
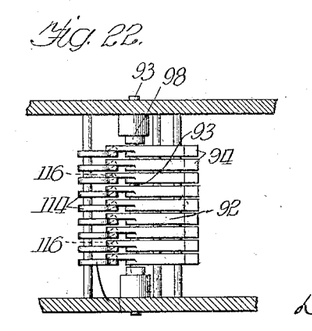

When it is desired to temporarily prevent the operation of the printing mechanism it is only necessary to prevent the engagement of the detents 92 with the type carrier. This may be accomplished in any desired manner. In the form shown (see Figs. 8 and 17) an extension 148 is provided upon the arm 99 and a movable stop 149 is attached to a shaft 150 adapted to engage the extension 148, when the arm 99 is operated to retract the detents from the type carrier, and prevent the operation of the detents when the movement of the cam 102 releases the arm 99.

Obviously when the printing operation is suspended it is unnecessary and undesirable to continue to feed the paper upon which the impressions are received. In the form shown therefore (see Figs. 5, 6 and 17) a second stop 151 is provided upon the shaft 150, adapted to engage the lever 122 when operated by the cam 128 and prevent its return by the spring 129 when released by the cam.

Any suitable means may be employed to control the movements of the shaft 150 and the position of the stops mounted thereon. In the form shown an arm 152 is rigidly connected to the shaft 150 and connected by a link 153 to a lever 154 pivoted at 155 upon the frame of my machine. A key 156 is connected by a stem 157 to the free end of the lever 154. In the preferred form shown the lever 154 is extended beyond its pivotal support as at 158 and connected by a spring 159 to a suitable portion of the frame of the device, thus normally holding the key 156 in an elevated position and the stops in position to prevent printing. A notch 160 is formed in the stem 157 and a pivotally mounted latch 161 is provided upon the top plate in proximity to the stem so that when the key is sufficiently depressed to release the printing mechanism the latch 161 will engage in the notch 160 and retain the parts in that position.

Having thus described my improvement it is obvious that various immaterial modifications may be made in my device without departing from the spirit of my invention, hence I do not wish to be understood as limiting myself to the exact form and construction shown.

What I claim as new, and desire to secure by Letters Patent is:—

1. In a computing machine or the like, printing mechanism adapted to simultaneously print a plurality of digits including a type carrier having a series of engaging points arranged thereon, a series of movable type corresponding to the position of the several engaging points, a single detent adapted to engage at any of said engaging points to temporarily control the position of said type carrier, and a hammer adapted to operatively move any of said type in printing position at each operation of the device, in combination with a lock arranged to prevent the operation of said hammer, and means upon said detent to operate said lock to release said hammer when said detent engages one of said engaging points.

2. In a computing machine or the like, printing mechanism arranged to simultaneously print a plurality of digits comprising a type carrier having a series of engaging points arranged thereon, a series of movable type mounted upon said carrier the number of said type exceeding the number of said points, a detent adapted to engage at any of said engaging points to temporarily control the position of said type carrier, and a hammer adapted to operatively move any of said type in printing position at each operation of the device, in combination with a lock arranged to prevent the operation of said hammer, and means upon said detent to operate said lock to release said hammer when said detent engages one of said engaging points.

3. In a computing machine or the like, printing mechanism arranged to simultaneously print a plurality of digits comprising a type carrier having a series of engaging points arranged thereon, a series of movable type mounted upon said carrier the number of said type exceeding the number of said points by one type, a single detent adapted to engage at any of said engaging points to temporarily control the position of said type carrier, and a hammer adapted to operatively move any of said type in printing position at each operation of the device, in combination with a lock arranged to prevent the operation of said hammer, and means upon said detent to operate said lock to release said hammer when said detent engages one of said engaging points.

4. In a computing machine or the like, printing mechanism adapted to simultaneously print a plurality of digits comprising a plurality of type carriers each provided with a series of engaging points, a series of movable type mounted upon each carrier, a detent for each carrier adapted to engage at any of said engaging points to temporarily control the position of said type carriers and aline the several series of type, and a hammer for each carrier adapted to operatively move any type in its series when in printing position at each operation of the device, in combination with a lock for each hammer arranged to prevent the operation of said hammers, and means upon said detents to operate said locks to release said hammers when their respective detents are engaged with said engaging points.

5. In a computing machine or the like, printing mechanism arranged to simultaneously print a plurality of digits comprising a plurality of type carriers each provided with a series of engaging points, a series of movable type mounted upon each carrier, a detent for each carrier adapted to engage at any of said engaging points to temporarily control the position of said type carriers and aline the several series of type, and a hammer for each carrier adapted to operatively move any type in its series when in printing position at each operation of the device, in combination with a lock for each hammer arranged to normally prevent the operation of said hammers, means upon each lock to operate the next adjacent lock at one side, and means upon each detent to operate its particular lock, thereby releasing one or more of said hammers only when a detent is engaged with one of said engaging points.

6. In a computing machine or the like, printing mechanism arranged to simultaneously print a plurality of digits comprising a plurality of movable type carriers, each provided with a series of engaging points, a series of independently movable type mounted upon each carrier, a detent for each carrier adapted to engage at any of said engaging points to temporarily control the position of said type carriers and aline the several series of type, and a hammer for each carrier adapted to operatively move any type in its series when in printing position at each operation of the device, in combination with a lock for each hammer arranged to normally prevent the operation of said hammers, means upon each lock to operate the next adjacent lock at one side, and means upon each detent to operate its particular lock, thereby releasing one or more of said hammers only when a detent is engaged with one of said engaging points.

7. In a computing machine or the like, printing mechanism arranged to simultaneously print a plurality of digits comprising a plurality of independently movable type carriers each provided with a series of engaging points, a series of movable type mounted upon each carrier, a single detent for each carrier adapted to engage at any of said engaging points to temporarily control the position of said type carriers and aline the several series of type, and a hammer for each carrier adapted to operatively move any type in its series when in printing position at each operation of the device, in combination with a lock for each hammer arranged to normally prevent the operation of said hammers, means upon each lock to operate the next adjacent lock at one side, and means upon each detent to operate its particular lock, thereby releasing one or more of said hammers only when a detent is engaged with one of said engaging points.

8. In a computing machine or the like, printing mechanism arranged to simultaneously print a plurality of digits comprising a plurality of type carriers each provided with a series of engaging points, a series of movable type mounted upon each carrier, a spring actuated detent for each carrier adapted to engage at any of said engaging points to temporarily control the position of said type carriers and aline the several series of type, and a hammer for each carrier adapted to operatively move any type in its series when in printing position at each operation of the device, in combination with a lock for each hammer arranged to normally prevent the operation of said hammers, means upon each lock to operate the next adjacent lock at one side, and means upon each detent to operate its particular lock, thereby releasing one or more of said hammers only when a detent is engaged with one of said engaging points.

9. In a computing machine or the like, printing mechanism arranged to simultaneously print a plurality of digits comprising a plurality of movable type carriers each provided with a series of engaging points, a series of movable type mounted upon each carrier, a single independent detent for each carrier adapted to engage at any of said engaging points to temporarily control the position of said type carriers and aline the several series of type, and a hammer for each carrier adapted to operatively move any type in its series when in printing position at each operation of the device, in combination with a lock for each hammer arranged to normally prevent the operation of said hammers, means upon each lock to operate the next adjacent lock at one side, and means upon each detent to operate its particular lock, thereby releasing one or more of said hammers only when a detent is engaged with one of said engaging points.

10. In a computing machine or the like, printing mechanism arranged to simultaneously print a plurality of digits comprising a plurality of type carriers each provided with a series of engaging points, a series of movable type mounted upon each carrier, a detent for each type carrier adapted to engage any of said engaging points, and a hammer for each carrier adapted to operatively move said type at each operation of the device, in combination with a lock for each hammer arranged to normally prevent the operation of said hammers, means upon said detents to operate said locks to release said hammers when their respective detents are engaged with said engaging points, and means adapted to engage said detents to prevent their engagement with said engaging points, thereby preventing the operation of said hammers.

11. In a computing machine or the like printing mechanism arranged to simultaneously print a plurality of digits comprising a plurality of type carriers, each provided with a series of engaging points, a series of movable type mounted upon each carrier, a detent for each type carrier adapted to engage any of said engaging points, and a spring actuated hammer for each carrier adapted to operatively move said type at each operation of the device, in combination with a lock for each hammer arranged to normally prevent the operation of said hammers, means upon said detents to operate said locks to release said hammers when their respective detents are engaged with said engaging points, and means adapted to engage said detents to prevent their engagement with said engaging points, thereby preventing the operation of said hammers.

12. In a computing machine or the like, printing mechanism arranged to simultaneously print a plurality of digits comprising a plurality of pivotally mounted type carriers each provided with a series of movable type mounted upon each carrier, a detent for each type carrier adapted to engage any of said engaging points, and a hammer for each carrier adapted to operatively move said type at each operation of the device, in combination with a lock for each hammer arranged to normally prevent the operation of said hammers, means upon said detents to operate said locks to release said hammers when their respective detents are engaged with said engaging points, and means adapted to engage said detents to prevent their engagement with said engaging points.

In testimony whereof, I have hereunto signed my name in the presence of two subscribing witnesses.

DANIEL W. SHIEK.

Witnesses:
WALTER N. MILLIKEN,
CLARENCE STANLEY.

Copies of this patent may be obtained for five cents each, by addressing the "Commissioner of Patents, Washington, D. C."